United States Patent
Iyer et al.

(10) Patent No.: US 12,430,468 B2
(45) Date of Patent: Sep. 30, 2025

(54) METHOD AND SYSTEM FOR MASKING PERSONALLY IDENTIFIABLE INFORMATION (PII) USING NEURAL STYLE TRANSFER

(71) Applicant: Zoho Corporation Private Limited, Chengalpattu Taluk (IN)

(72) Inventors: Sujatha S. Iyer, Chengalpet (IN); Balachandar S., Chengalpet (IN); Ramprakash Ramamoorthy, Kanchipuram District (IN); Shailesh Kumar Davey, Potheri (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 163 days.

(21) Appl. No.: 17/894,297

(22) Filed: Aug. 24, 2022

(65) Prior Publication Data

US 2023/0077317 A1     Mar. 9, 2023

Related U.S. Application Data

(60) Provisional application No. 63/257,732, filed on Oct. 20, 2021.

(30) Foreign Application Priority Data

Aug. 24, 2021   (IN) .............................. 202141038305
Aug. 24, 2022   (IN) .............................. 202141038305

(51) Int. Cl.
  *G06F 21/62*   (2013.01)
  *G06F 21/60*   (2013.01)
  *G06T 11/00*   (2006.01)
  *G06T 11/20*   (2006.01)

(52) U.S. Cl.
  CPC .......... *G06F 21/6254* (2013.01); *G06F 21/60* (2013.01); *G06F 21/602* (2013.01); *G06F 21/6245* (2013.01); *G06T 11/001* (2013.01); *G06T 11/203* (2013.01)

(58) Field of Classification Search
  None
  See application file for complete search history.

(56) References Cited

U.S. PATENT DOCUMENTS

| | | | | |
|---|---|---|---|---|
| 10,318,809 B2 * | 6/2019 | Schultz | ...................... | B60R 1/27 |
| 10,803,095 B2 * | 10/2020 | Grant | ..................... | G06F 16/285 |
| 10,839,104 B2 * | 11/2020 | Balzer | ................. | H04L 63/0421 |
| 11,126,788 B2 * | 9/2021 | Fisher | .................. | G06V 30/245 |
| 11,145,042 B2 * | 10/2021 | Kubendran | .............. | G06N 3/04 |
| 11,683,362 B2 * | 6/2023 | Chung | ................... | H04L 67/04 |
| | | | | 382/274 |

(Continued)

FOREIGN PATENT DOCUMENTS

WO   WO-2020018103 A1 *   1/2020   ........... G06T 11/203

*Primary Examiner* — Lashonda Jacobs-Burton
(74) *Attorney, Agent, or Firm* — Ahmann Kloke LLP

(57) ABSTRACT

A system and method for masking personally identifiable information (PII) using neural style transfer is disclosed. The present disclosure helps tackle the problem of PII being harvested from documents for illegitimate purposes. The present disclosure also curtails unscrupulous means of employing an optical character recognition (OCR) engine in exploiting or harvesting PII from digitized documents. Techniques described in this paper include customized PII masking.

21 Claims, 12 Drawing Sheets

(56) References Cited

U.S. PATENT DOCUMENTS

| | | | |
|---|---|---|---|
| 11,729,149 B2* | 8/2023 | Mooney | H04L 9/0891 |
| | | | 726/26 |
| 11,776,287 B2* | 10/2023 | Barzelay | G06V 30/153 |
| | | | 382/181 |
| 11,847,248 B2* | 12/2023 | Vaughan | G16H 10/60 |
| 11,861,890 B2* | 1/2024 | Karras | G06V 10/82 |
| 11,977,660 B2* | 5/2024 | Gupta | G06F 16/335 |
| 2017/0187748 A1* | 6/2017 | Durand | H04L 63/1475 |
| 2017/0337393 A1* | 11/2017 | Crowe | G06F 21/6254 |
| 2018/0262641 A1* | 9/2018 | Goldsmith | H04N 1/32149 |
| 2018/0276393 A1* | 9/2018 | Allen | G06F 21/602 |
| 2018/0285599 A1* | 10/2018 | Praveen | G06F 18/22 |
| 2018/0373999 A1* | 12/2018 | Xu | G06V 20/49 |
| 2020/0026877 A1* | 1/2020 | Dattatri | G06F 21/6254 |
| 2020/0175295 A1* | 6/2020 | Palmer | G06V 30/245 |
| 2020/0285771 A1* | 9/2020 | Dey | G06F 21/6272 |
| 2021/0097197 A1* | 4/2021 | Kulkarni | G06F 21/6254 |
| 2021/0097201 A1* | 4/2021 | Wasicek | G06F 21/32 |
| 2021/0125615 A1* | 4/2021 | Medalion | G06N 3/044 |
| 2021/0183033 A1* | 6/2021 | Chung | G06T 5/92 |
| 2021/0232701 A1* | 7/2021 | Goel | H04L 9/3213 |
| 2021/0390247 A1* | 12/2021 | Goodsitt | G06F 40/186 |
| 2022/0083601 A1* | 3/2022 | Ojha | G06F 16/90335 |
| 2022/0198691 A1* | 6/2022 | Chen | G06V 10/25 |
| 2022/0229934 A1* | 7/2022 | Gordon | G06F 16/93 |
| 2022/0272124 A1* | 8/2022 | Zawadzki | H04M 15/62 |
| 2022/0335153 A1* | 10/2022 | Herman | G06N 3/094 |
| 2022/0335159 A1* | 10/2022 | Hahn | G06F 21/6281 |
| 2022/0414264 A1* | 12/2022 | Ananthanarayanan | |
| | | | G16Y 40/50 |
| 2023/0094787 A1* | 3/2023 | Bal | G06V 30/15 |
| | | | 382/100 |
| 2023/0229803 A1* | 7/2023 | Mozer | G06T 7/194 |
| | | | 726/26 |
| 2023/0409725 A1* | 12/2023 | Burke | G06F 21/6254 |
| 2024/0086762 A1* | 3/2024 | Deosthali | G06N 20/00 |
| 2024/0185381 A1* | 6/2024 | Malek | G06T 5/50 |

* cited by examiner

100

I, Sujatha S Iyer, holder of AXGQB7655Z would like to buy 37 units of your mutual fund. My Aadhar number is 999941057058. Please allot the units as soon as possible

FIG. 1

I, Sujatha S Iyer, holder of ~~PAN~~ would like to buy 37 units of your mutual fund. My Aadhar number is ~~XXXXXXXX~~. Please allot the units as soon as possible

METHOD AND SYSTEM FOR MASKING PERSONALLY IDENTIFIABLE INFORMATION (PII) USING NEURAL STYLE TRANSFER

TECHNICAL FIELD

Embodiments of the present disclosure are related, in general, to computer vision techniques and more particularly, but not exclusively to a method and system for masking personally identifiable information.

BACKGROUND

Data masking or data obfuscation is the process of hiding original data with modified content (characters or other data.) The main reason for applying masking to a data field is to protect data that is classified as personally identifiable information (PII), sensitive personal data, or commercially sensitive data. However, the data must remain usable for the purposes of undertaking valid test cycles. It is more common to have masking applied to data that is represented outside of a corporate production system. In other words, where data is needed for the purpose of application development, building program extensions, and conducting various test cycles. It is common practice in enterprise computing to take data from the production systems to fill the data component, required for these non-production environments.

Computer vision techniques are getting better day by day, documents that are digitized using Optical Character Recognition (OCR) for ease of use, carry an inherent risk of Personally Identifiable Information (PII) being exploited for illegal purposes.

SUMMARY

The present disclosure is related to a system for masking Personally Identifiable Information (PII). The system is configured to first detect and extract personally identifiable information from a given piece of text. Ideally, the system transforms PII text in such a way that it cannot be deciphered by an Optical Character Recognition (OCR) engine and yet remains recognizable and understandable for human eyes.

BRIEF DESCRIPTION OF DRAWINGS

The accompanying drawings, which are incorporated in and constitute a part of this disclosure, are provided to illustrate embodiments and, together with the detailed description, explain disclosed principles. One skilled in the relevant art will recognize alternative embodiments of the structures and methods described herein may be employed without departing from the principles of the disclosure. Some embodiments are now described with reference to the accompanying figures, by way of example, in which:

FIG. 1 illustrates an example of a sample text document with unmasked Personally Identifiable Information (PII).

FIG. 2 illustrates an example of a text document with PII masked using neural style transfer technique.

DETAILED DESCRIPTION

Figure 3:
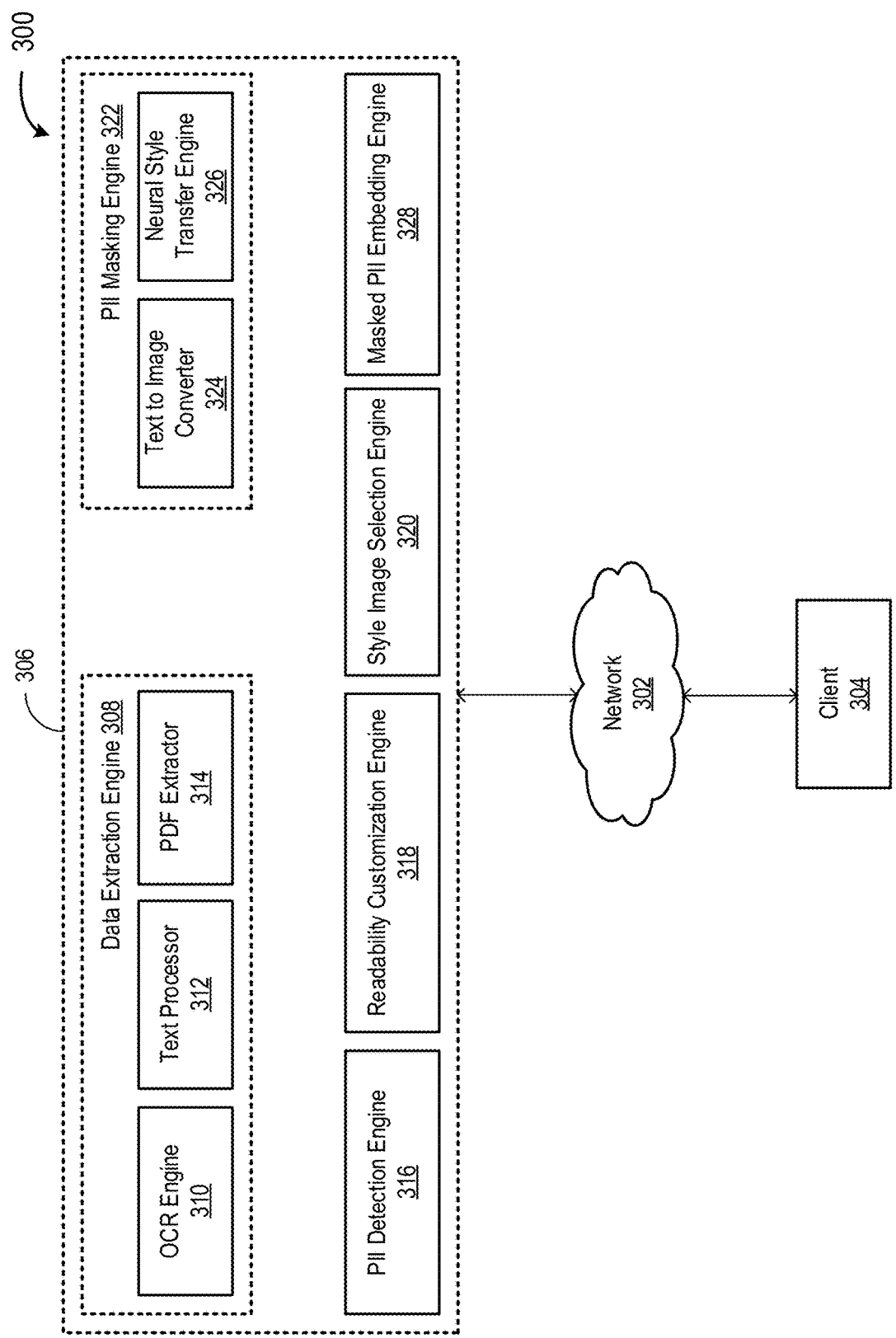
FIG. 3 illustrates an architecture of an example of PII masking system.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description, reference is made to the accompanying drawings that form a part hereof, and in which are shown by way of example specific embodiments in which the disclosure may be practiced. It is to be understood that other embodiments may be utilized and that changes may be made without departing from the scope of the present disclosure.

FIG. 1 illustrates an example 100 of a sample text document with unmasked Personally Identifiable Information (PII). Techniques described in this paper can be used to transform PII text, such as that illustrated in FIG. 1 by way of example, in such a way that it cannot be recognized by Optical Character Recognition (OCR) engines. This can curtail unscrupulous means of exploiting or harvesting PII from digitized documents. Techniques provided in this paper can be used to mask PII in any applicable document (e.g., text, pdf, image, and other types of documents) using neural style transfer technique. This makes it difficult for bots, malicious actors, automation scripts, or other entities to extract PII from a digitized document yet making it recognizable for authorized humans.

FIG. 2 illustrates an example 200 of a text document with PII masked using neural style transfer technique. For illustrative purposes, FIG. 2 shows the same text document as was shown in FIG. 1, but with the PII masked using neural style transfer.

FIG. 3 illustrates an architecture 300 of an example of PII masking system. The PII masking system as shown in FIG. 3, comprises a network 302, a client 304 coupled to the network 302, a server 306 coupled to the network 302. The server 306 includes a data extraction engine 308 that comprises an OCR engine 310, a text processor 312, and a pdf extractor 314; a PII detection engine 316, a readability customization engine 318, a style image selection engine 320, a PII masking engine 322 that comprises a text to image converter 324 and a neural style transfer engine 326; and a masked PII embedding engine 328.

The network 302 and other networks discussed in this paper are intended to include all communication paths that are statutory (e.g., in the United States, under 35 U.S.C. 101), and to specifically exclude all communication paths that are non-statutory in nature to the extent that the exclusion is necessary for a claim that includes the communication path to be valid. Known statutory communication paths include hardware (e.g., registers, random access memory (RAM), non-volatile (NV) storage, to name a few), but may or may not be limited to hardware.

The network 302 and other communication paths discussed in this paper are intended to represent a variety of potentially applicable technologies. For example, the network 302 can be used to form a network or part of a network. Where two components are co-located on a device, the network 302 can include a bus or other data conduit or plane. Where a first component is co-located on one device and a second component is located on a different device, the network 302 can include a wireless or wired back-end network or LAN. The network 302 can also encompass a relevant portion of a WAN or other network, if applicable.

The devices, systems, and communication paths described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

Returning to the example of FIG. 1, at least for illustrative purposes due to the focus in this disclosure on viewing documents, the client 304 can include one or more client devices, such as smartphones, desktops, laptops, tablets, or other device(s) through which a human or a human or artificial agent of an organization can view documents. As used in this paper the term "client" is intended to represent one part of a client-server relationship with the server 306. It should be noted, however, that techniques described in this paper can be accomplished using devices that would not normally be referred to as "clients" and "servers."

The server 306 is the other part of the client-server relationship with the client 304. For illustrative purposes, the server 306 is depicted as having the engines carrying out techniques, but it should be noted the server 306 could be implemented on distinct devices coupled together using a bus, network, or other applicable interface. As used in this paper, an engine includes one or more processors or a portion thereof. A computer system can be implemented as an engine, as part of an engine or through multiple engines. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

The data extraction engine 308 is intended to represent an engine that extracts the text data from the input document. The input document can be text, pdf, an image file, or some other applicable file type. In a specific implementation, if an author wants to mask PII content in images (e.g., images of documents), the images are first fed to the OCR engine 310. As used in this paper, authors are users of a system that are responsible for creating, editing, or updating data that includes PII. If the input document is in text format e.g., a Word® document, then the text processor 312 is employed to extract the text data from the document. In a specific implementation the author of a document or a human or artificial agent thereof, or an editor or the equivalent, is presented with an option to embed an intended viewer's information, or information associated with a class of potential viewers, into the masked PII image and share the document containing the watermarked and masked PII image in order to safeguard content using both watermarking and masking.

If the input document is in Portable Document Format (PDF), then the PDF extractor 314 is employed to extract the text from the PDF document.

The OCR engine 310 extracts text from images. In a specific implementation, the OCR engine 312 first makes a pass through the images and tries to identify word boundaries. Content inside the boundary is fed to, for example, a Long Short-Term Memory (LSTM) network that outputs the text present in the input image.

If the document includes an image of an identity document, e.g., Passport, driving license etc. (containing a unique identification number of the person and the face of the person), the unique identification number will be masked appropriately. A provision could be provided to apply neural style transfer to the face of the person in the image of the ID document to anonymize the face thus enhancing privacy.

Figure 4:
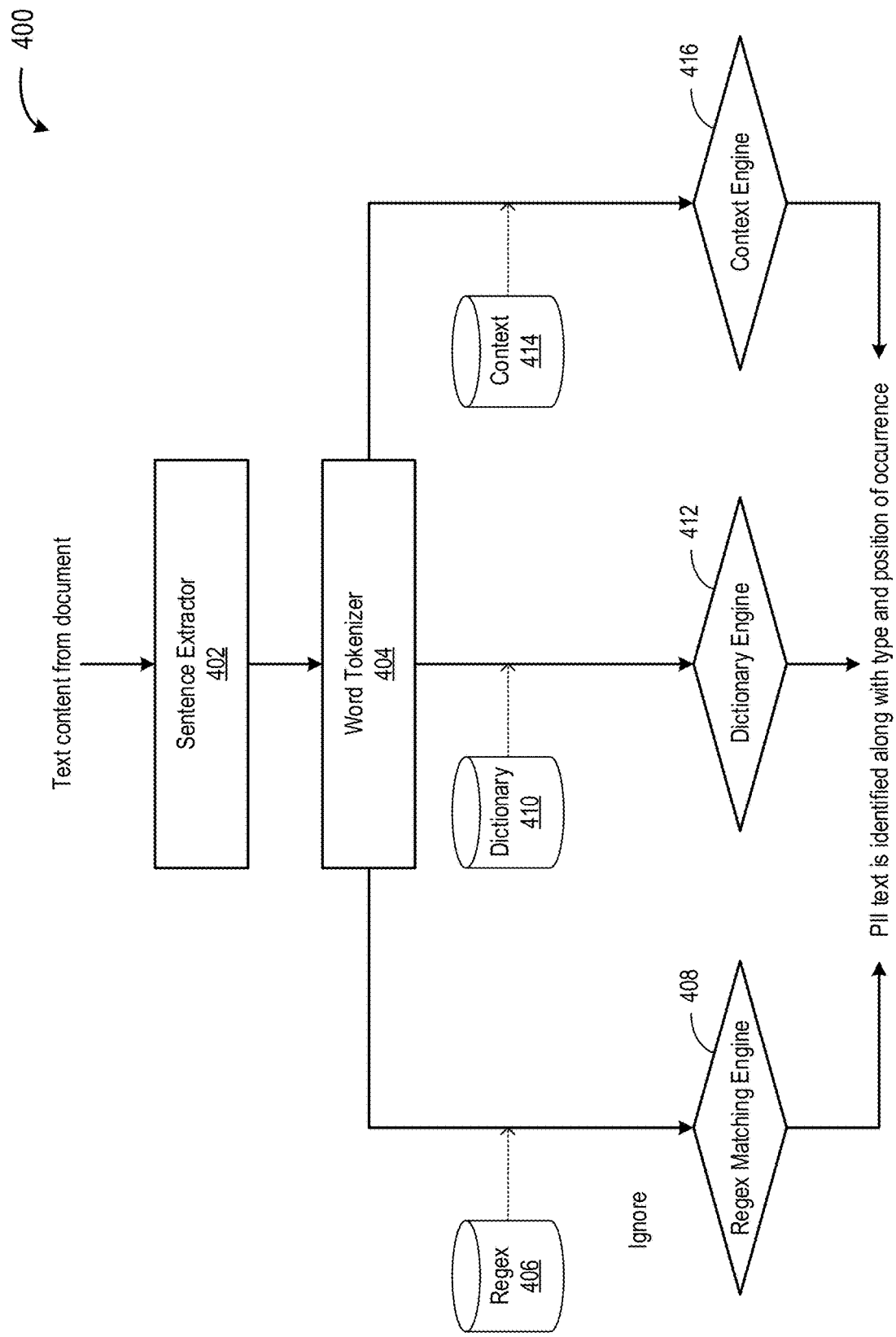
FIG. 4 is a block diagram of an example of a PII detection engine.

The PII detection engine 316, which is described in more detail below with reference to FIG. 4, is intended to represent an engine that is capable of detecting PII in any applicable document. In a specific implementation, the PII detection engine 316 employs a rule-based mechanism and identifies PII text (if any) in a document. In general, the PII detection engines 316 tries to locate PII text (if any) in any given input. For example, given the content of a document as an input, the PII detection engine 316 is configured to detect PII present in it. In a specific implementation, the PII detection engine 316 also determines the position of the PII text.

The style image selection engine 320 allows personalization while picking a style image from a style datastore. A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The readability customization engine 318 provides options for enhanced readability based on enhanced access control.

Referring once again to the example of FIG. 3, in a specific implementation, the style image selection engine 320 allows preferential selection of style images in order to cater to viewers with visual impairments, general preferences, to establish a type of stylistic consistency, or the like. As used in this paper, viewers are intended to represent users of a system that renders a document containing masked PII. A viewer and an author can, in some instances, be a single user.

Figure 5:
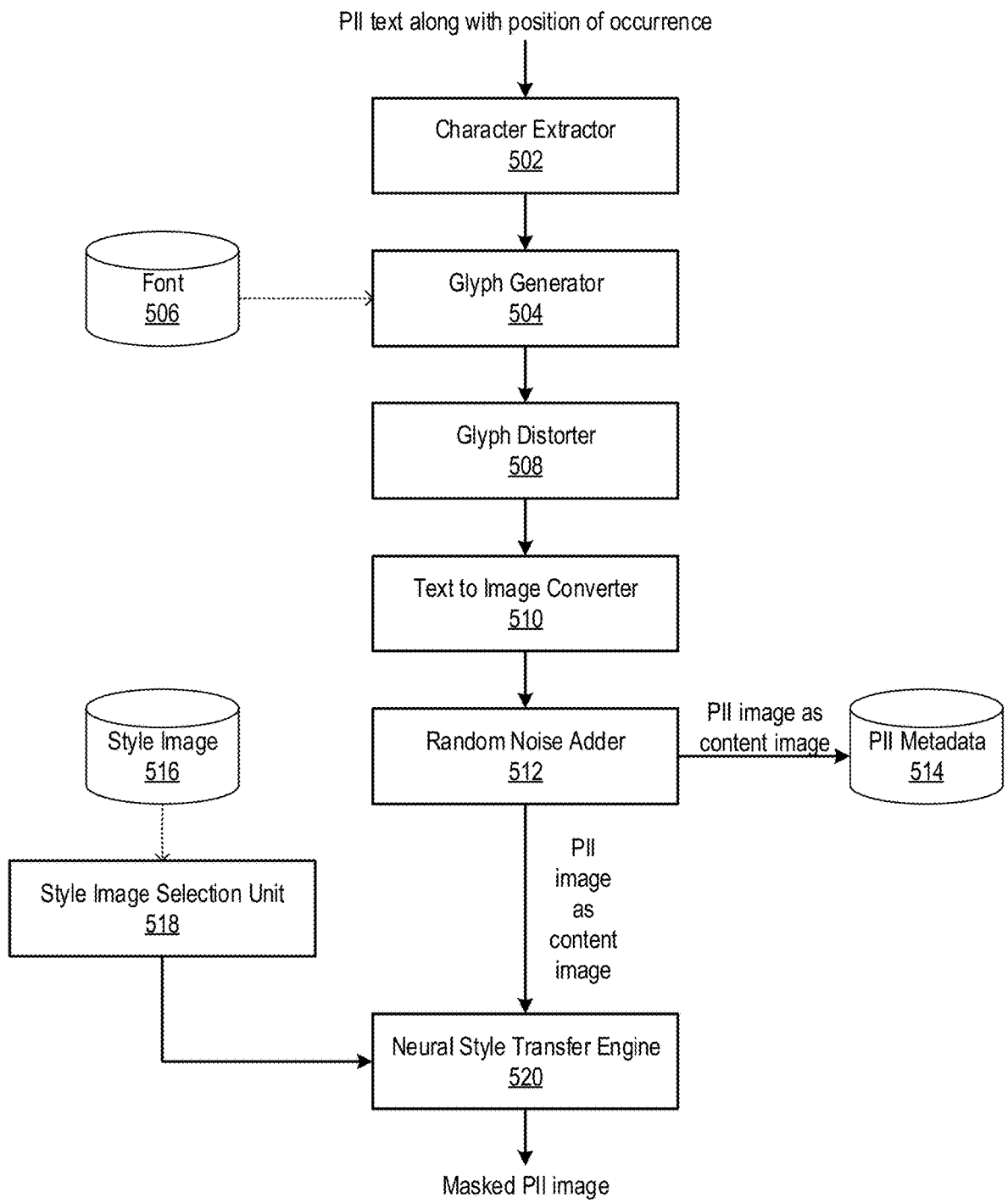
FIG. 5 is a block diagram of an example of a PII masking engine.

The PII masking engine 322, which is described in more detail below with reference to FIG. 5, is intended to represent an engine that masks PII found in a document for the purpose of presenting it in an obfuscated form. In a specific implementation, the PII masking engine 322 utilizes a text to image converter 324 and a neural style transfer engine 326.

FIG. 4 is a block diagram 400 of an example of a PII detection engine. The block diagram 400 includes a sentence extractor 402, a word tokenizer 404, a regex datastore 406, a regex matching engine 408, a dictionary datastore 410, a dictionary matching engine 412, a context datastore 414, and a context matching engine 416.

In the example of FIG. 4, the sentence extractor 402 receives text content from a document as extracted by a data extractor, such as the data extraction engine 308 described by way of example in FIG. 3. The sentence extractor 402 extracts individual sentences from the content. In a specific implementation, sentences are subjected to word-by-word tokenization by the word tokenizer 404. The tokens are then fed to the regex matching engine 408, the dictionary matching engine 412, and the context matching engine 416.

The regex datastore 406 includes regular expressions that can help identify patterns that may be applicable to various kinds of PII. The regex matching engine 408 checks an incoming token against one or more regular expressions stored in the regex datastore 406 and identifies a PII. The dictionary datastore 410 includes keywords that help identify PII. The dictionary matching engine 412 uses the dictionary datastore 410 to match PII and/or other text to the keywords. The context datastore 414 includes contextual information that helps in identifying PII related context. The context matching engine 416 uses the context datastore to match PII and/or text to a relevant context, such as sales, real estate, or contract. The regex, dictionary and context matching engines may collectively or independently identify the occurrence of PII text in an input document. For example, if an engine finds nothing that rises to a relevance threshold, the results of the engine can be ignored in favor of the other engines, or one of them. The PII text and its type and position of occurrence, detected by the PII detection engine, is passed on to a PII masking engine.

The following are the types of PII that are detected by an implementation of a PII detection engine:

| Sl No. | Types Of PII |
| --- | --- |
| 1. | ArgentinaNationalIdentityNumber |
| 2. | AustraliaBankAccountNumber |
| 3. | AustraliaDriverLicenseNumber |
| 4. | AustraliaMedicalAccountNumber |
| 5. | AustraliaPassportNumber |
| 6. | AustraliaTaxFileNumber |
| 7. | BelgiumNationalNumber |
| 8. | BrazilCPFNumber |
| 9. | BrazilLegalEntityNumbe |
| 10. | BrazilNationalIDCard |
| 11. | CanadaBankAccountNumber |
| 12. | CanadaDrivingLicenseNumber |
| 13. | CanadaHealthServiceNumber |
| 14. | CanadaPassportNumber |
| 15. | CanadaPersonalHealthServiceNumber |
| 16. | CanadaSocialInsuranceNumber |
| 17. | ChileIdentityCardNumber |
| 18. | ChinaCreditCardNumber |
| 19. | ChinaResidentIdentityCardNumber |
| 20. | CrotiaIdentityCardNumber |
| 21. | CrotiaPersonalIdentificationNumber |
| 22. | CzechNationalIdentityCardNumber |
| 23. | DenmarkDenmarkPersonalIdentificationNumber |
| 24. | EuDebitCard |
| 25. | FinlandNationalID |
| 26. | FinlandPassportNumber |
| 27. | FranceDriverLicenseNumber |
| 28. | FranceNationalIDCardNumber |
| 29. | FrancePassportNumber |
| 30. | FranceSocialSecurityNumber |
| 31. | GermanyDriverLicense |
| 32. | GermanyIdentityCardNumber |
| 33. | GermanyPassportNumber |
| 34. | GreeceNationalIDCard |
| 35. | HongkongIdentityCardNumber |
| 36. | IndiaAadhaar |
| 37. | IndiaPermanentAccountNumber |
| 38. | IndonesiaKTP |
| 39. | InternationalIBAN |
| 40. | InternationalIP |
| 41. | InternationalPhoneNumber |
| 42. | InternationalEmail |
| 43. | InternationalSWIFTCode |
| 44. | IrelandPPSN |
| 45. | IsraelIBA |
| 46. | IsraelIsrealBankAccountNumber |
| 47. | IsraelIsrealNationalID |
| 48. | ItalyDriverLicenseNumber |
| 49. | JapanBankAccountNumber |
| 50. | JapanDriverLicenseNumber |
| 51. | JapanPassportNumber |
| 52. | JapanResidentRegistrationNumber |
| 53. | JapanSocialInsuranceNumber |
| 54. | MalaysiaIdentityCard |
| 55. | NetherlandsCitizenServiceNumber |
| 56. | NewzealandMinistryOfHealthNumber |
| 57. | NorwayIdentityNumber |
| 58. | PhilippinesUnifiedMultipurposeIDNumber |
| 59. | PolandIdentityCard |
| 60. | PolandPassport |
| 61. | PolandPESEL |
| 62. | PortugalCitizenCardNumber |
| 63. | SaudiarabiaNationalId |
| 64. | SingaporeNationalRegistrationIdentityCardNumber |
| 65. | SouthafricaIdentificationNumber |
| 66. | SouthkoreaResidentRegistrationNumber |
| 67. | SpainSocialSecurityNumber |
| 68. | SwedenNationalIDNumber |
| 69. | SwedenPassportNumber |
| 70. | TaiwanNationalID |
| 71. | TaiwanPassportNumber |
| 72. | TaiwanResidentCertificate |
| 73. | UKDriverLicenseNumber |

-continued

| Sl No. | Types Of PII |
|---|---|
| 74. | UKElectoralRollNumber |
| 75. | UKNationalHealthServiceNumber |
| 76. | UKNINO |
| 77. | UKPassportNumber |
| 78. | USABARoutingNumber |
| 79. | USBankAccountNumber |
| 80. | USDEANumber |
| 81. | USDriverLicenseNumber |
| 82. | USSocialSecurityNumber |
| 83. | USTaxpayerIdentificationINumber |

FIG. 5 is a block diagram 500 of an example of a PII masking engine. The block diagram 500 includes a character extractor 502, glyph generator 504, a font datastore 506, a glyph distorter 508, text to image converter 510, random noise adder 512, a PII metadata datastore 514, a style image datastore 516, a style image selection unit (or engine), and a neural style transfer engine 520. The character extractor 502 is intended to represent an engine that extracts characters from each PII text and feeds it to the glyph generator 504.

Glyphs for each font are stored in the font datastore 506. In a specific implementation, the glyph generator 504 regenerates an incoming character into a font format found in the font datastore 506. Based on domain knowledge of the PII, the glyphs are generated intelligently. For example, the number "6" could be replaced by a distorted "b" or the number "0" could be replaced by "o" For example, if a PII would only contain digits, such replacements help in ensuring the PII is incorrectly deciphered when unscrupulous ways are employed to harvest PII.

In a specific implementation, the glyph distorter 508 provides slight distortions to the font. The text to image converter 510 renders the extracted PII text in to a PII image with letters slightly distorted or disoriented. The random noise adder 512 adds random noise (e.g., salt and pepper look or a horizontal line to the PII image, after which the PII image is stored in the PII metadata datastore 514 as a content image. The PII datastore can also comprise metadata, which can include, for example, starting position of PII within a document, length of the PII (e.g., number of characters), height and width of the PII (e.g., number of pixels), and ending position of the PII within the document. This ensures the process of PII detection, distortion, noise addition needed be done again by the readability customization engine while trying to provide different flavors/variations for customizing readability.

The style image datastore 516 includes multiple style images. In a specific implementation, the style image selection engine 518 enables personalize selection of a style image. For example, based on a preference of a viewer or an entity associated with the viewer or author (preference for color, preference for image category, preference for texture), style images are preferentially fetched from the style datastore 516. In another implementation, preferential selection caters to viewers with visual impairment by excluding style images containing colors for which perception is difficult for a viewer from style image selection options. For example, if a viewer has difficulty perceiving red color, blue/green color style images might be used for the purpose of neural style transfer.

The PII image from the random noise adder 512 (or from the PII metadata datastore 514) and the style image from the style image selection engine 518 are provided to the neural style transfer engine 520.

Figure 6:
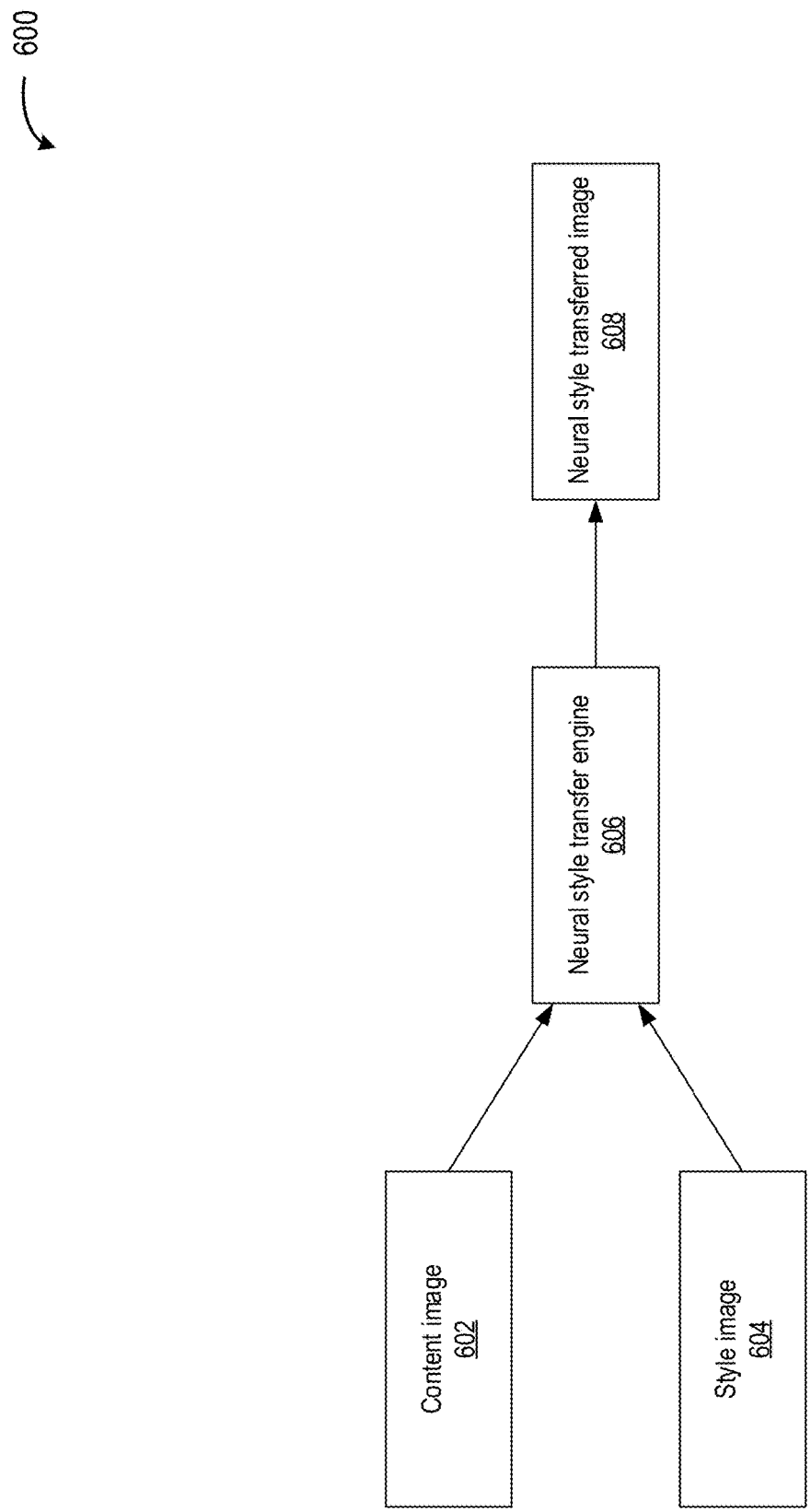
FIG. 6 illustrates a basic flow of a neural style transfer engine.
Figure 7:
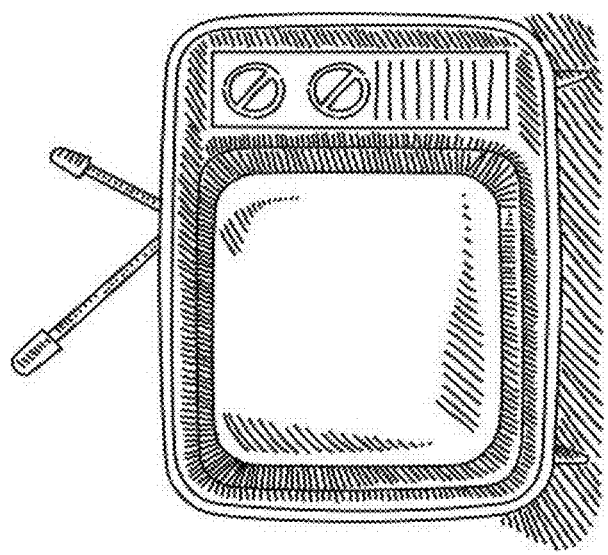
FIG. 7 shows an example of a content image.
Figure 8:
FIG. 8 shows an example of a style image.

FIG. 6 illustrates a basic flow 600 of a neural style transfer engine. The neural style transfer is essentially an image generation technique. A neural style transfer engine 606 takes a pair of images as input; namely a content image 602 and a style image 604 and generates a neural style transferred image 608. The content image 602 includes an image of the object or text whose texture or style is to be changed. An example of a content image is shown in FIG. 7. The style image could be any image with a distinct texture whose stylistic properties will be transferred to the content image. Images that have a distinct texture could be used as style image. An example of a style image is shown in FIG. 8.

Figure 9:
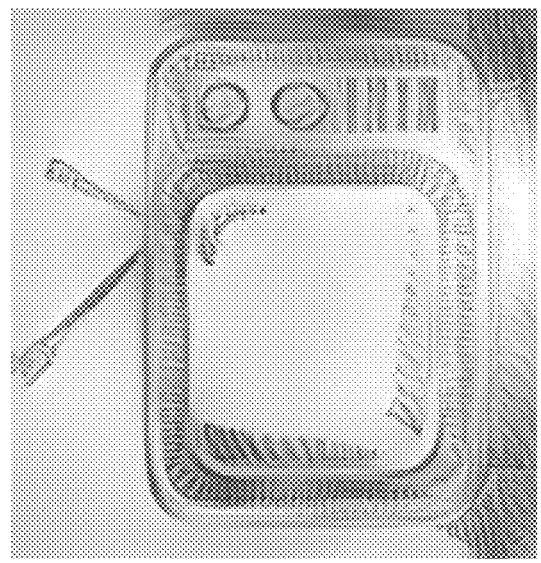
FIG. 9 shows an example of a neural style transferred image.

Given a content image and style image, the neural style transfer engine generates a new style transferred image which is essentially the content image carrying the characteristics of the style image. An example of a neural style transferred image is shown in FIG. 9. The generated image will have a change in the texture which plays a key role in defying and tackling object recognition system and OCR engines.

Figure 10:
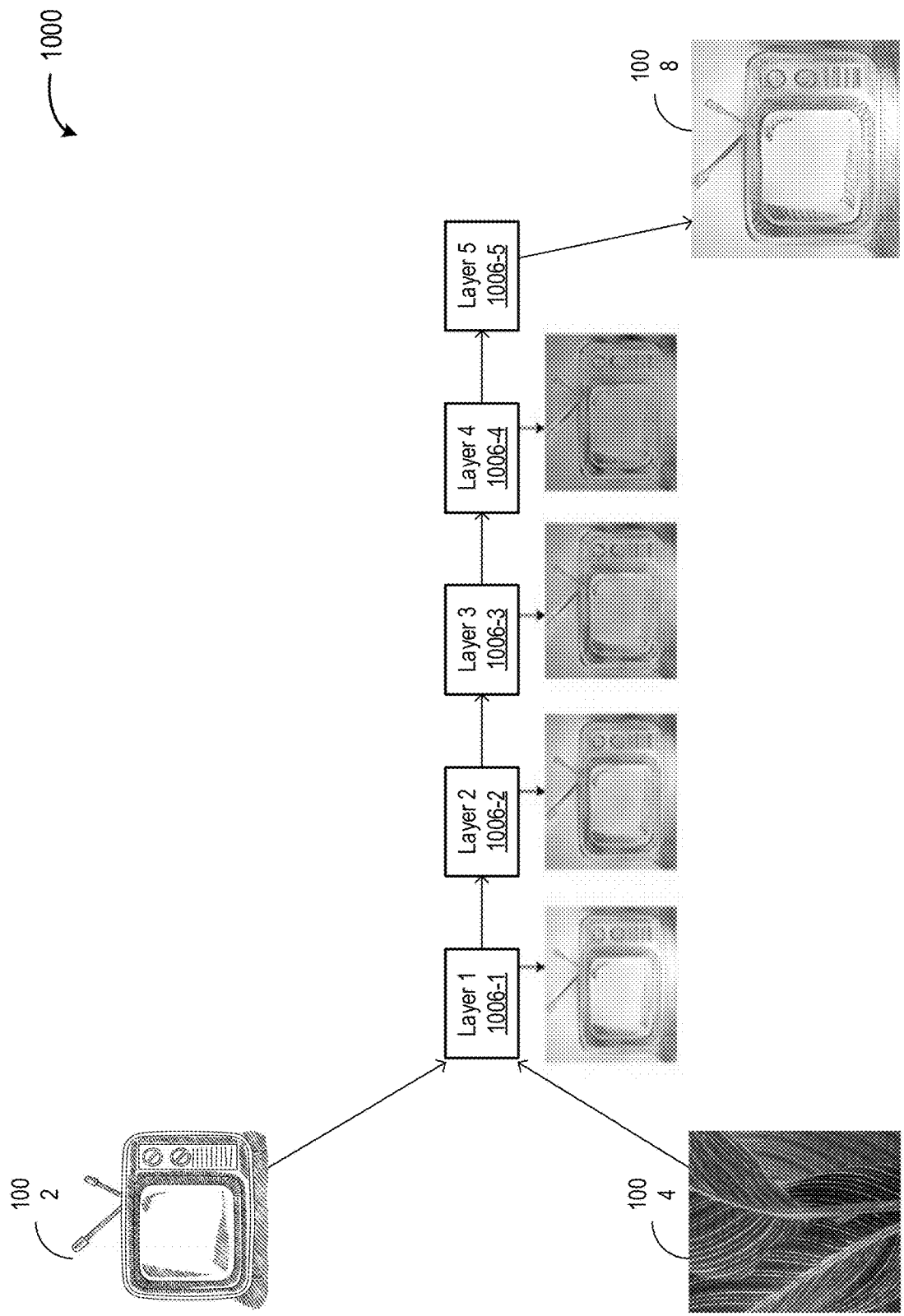
FIG. 10 illustrates an architecture of an example of a neural style transfer engine.

FIG. 10 illustrates an architecture of an example of a neural style transfer engine 1000. The neural style transfer engine 1000 receives a content image 1002 and a style image 1004, which are passed though Layer 1 (1006-1) to Layer 5 (1006-5), collectively, the Layers 1006, to provide a neural style transferred image 1008. Output from each layer, which is generally increasingly obfuscated as it passes from later to layer, can be stored in a PII metadata datastore for later reference.

In the example of FIG. 10, the neural style transfer engine architecture consists of 5 layers of VGG-19 encoder and decoder with Rectified Linear Activation Function (ReLU) as the activation function. In alternative embodiments, a different type of encoder and decoder could be used, and more or less than five layers is certainly possible. The engine deploys a simple yet effective method for universal style transfer, which enjoys the style-agnostic generalization ability with marginally compromised visual quality and execution efficiency. The transfer task is formulated as an image reconstruction process, with the content features being transformed at intermediate layers about the statistics of the style features, in the midst of feed-forward passes. In each intermediate layer, the extracted content features are transformed such that they exhibit the same statistical characteristics as the style features of the same layer. The classic signal whitening and coloring transforms (WCTs) have been applied on those features to achieve this goal in an almost effortless manner. The neural style transfer engine takes the PII image (as Content image) and a style image (from a set of collected style images) to generate style transferred images that serve as masked PII. The masked PII generated using neural style transfer technique is thus read or understood by human beings but ideally cannot be extracted by OCR engine. The neural style transfer is applied to text images, the change in texture of the text image makes it difficult for OCR engines to extract text. The output from the Neural style transfer engine is essentially a style transferred image which is the masked PII text image. The masked PII embedding engine replaces or embeds the obtained style transferred image in place of PII text in the document. By default, the masked PII image from layer 5 is placed. The option to view different flavors are provided by readability customization engine based on access control.

In a specific implementation, in order to ensure the masked PII image fits into the place of PII text in the original document, the neural style transfer engine first calculates the width and height of the PII text in the original document.

The masked PII image is then resized to the height and width determined earlier. The PII text is then replaced/overwritten by the resized masked PII image. This helps evade crawling bots that crawl content for unscrupulous means since the PII will no longer be available as text, but as an image that ideally cannot be deciphered using OCR techniques.

As one goes deeper into the layers, the style property in increasingly transferred. E.g., the ability to decipher text from the output of Layer 5 (neural style transferred image from Layer 5) is going to be the most difficult followed by layer 4 and then layer 3 and so on.

A readability customization engine caters to a viewer's convenience. It could be in the form of a component in a User Interface (UI) where a viewer can select a less difficult option if unable to decipher a presented masked PII. For example, if the viewer is not able to decipher the text from Layer 4, the viewer can switch to an even easier variant option by choosing the appropriate option from a UI component. On occurrence of such action, an on-the-fly neural style transfer would be performed and the output would be fetched from the earlier layers where the style property transfer/distortion is on a lesser scale. In a specific implementation, the output of each layer is stored in a PII metadata datastore for later utilization.

Figure 11:
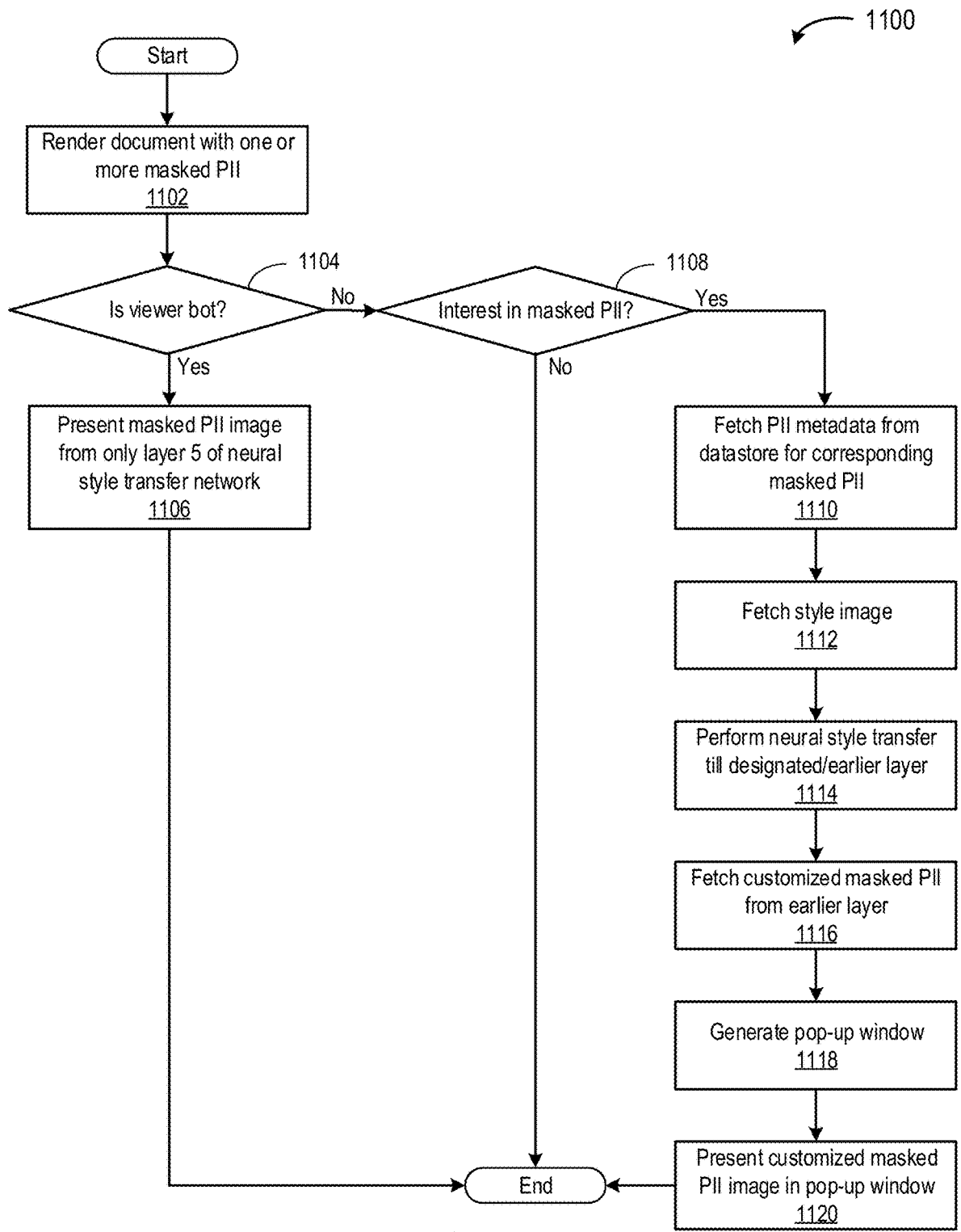
FIG. 11 is a flowchart of an example of a method of readability customization.

FIG. 11 is a flowchart 1100 of an example of a method of readability customization. The flowchart 1100 starts at module 1102 with rendering a document with one more masked PII.

At decision point 1104 it is determined whether an identified viewer is a bot. A bot traffic detection suite can be used to detect the presence of a bot, automation script, or malicious actor. As used in this paper, the word "bot" is intended to include automation script or malicious actor, unless explicitly otherwise stated or inappropriate in a given context. For example, a bot traffic detection suite may include automation script detection, as well. An automation script can be detected, for example, using inconsistencies in attributes obtained from a client. A malicious actor can be detected, for example, using behavior metrics. By default, the masked PII image with the highest distortion is used initially, and if a bot is detected, it is not allowed to select a masked PII image with less distortion or a request for same would be denied, potentially with countermeasures to boot. This helps in preventing PII harvesting using web scraping bots which in turn make use of OCR to decipher the text.

If it is determined the viewer is a bot (1104—Yes), then the flowchart 1100 ends at module 1106 with presenting masked PII image from only layer 5 of neural style transfer network. More generally, the most obfuscated masked PII image would generally be presented here, which may or may not be layer 5 depending upon configuration- and/or implementation-specific factors, such as if a system does not employ 5 layers. When a bot is detected, in addition to no further customization options being allowed, alerts may be generated related to the attempted access and/or countermeasures employed. In a specific implementation, the viewer or an agent of the viewer is presented with a CAPTCHA and the flowchart proceeds only upon receiving a correct solution to the CAPTCHA.

If, on the other hand, it is determined the viewer is not a bot (1104—No), which also precludes automation scripts, malicious actors, or other agents who are not authorized viewers, the flowchart 1100 continues to decision point 1108 where it is determined whether a viewer has an interest in the masked PII. Interest can be detected by determining the viewer is using an input device to hover over the masked PII image, determining the viewer selected the masked PII image or a UI element associated therewith, determining the user selected an explicit indication of interest, such as a toggle or button that explicitly requests a reduced-obfuscation masked PII image, or in another applicable manner.

If it is not determined a viewer does not express interest in the masked PII (1108—No), the flowchart 1100 ends. Depending upon implementation- and/or configuration-specific factors, the viewer may be allowed to express interest while the document is open, after a duration of time, or in some other applicable manner, but the presumption for the purposes of this example is the viewer declines to express an interest in receiving a less obfuscated masked PII image, such as a masked PII image from earlier layers than the one currently rendered.

If, on the other hand, it is determined a viewer expresses interest in the masked PII (1108—Yes), the flowchart 1100 continues to module 1110 with fetching PII metadata from a PII metadata datastore for a corresponding masked PII. For example, the position co-ordinates of the masked PII can be determined as the viewer hovers over it or selects it; based on the co-ordinates position, a corresponding PII image (post addition of distortion and noise) can fetched from the PII datastore as described below. A credential based PII revealing can also be incorporated where the recipient having the highest level of access control will be presented with easier distortions when compared to guests, the general public, an audience, or some other agent with weaker credentials. This ensures recipient's with the highest level of trust are presented with an easier option more rapidly, because they would carry higher trust.

The flowchart 1100 then continues to module 1112 with fetching a style image, to module 1114 with performing neural style transfer till a designated or earlier layer, and to module 1116 with fetching a customized masked PII from an earlier layer. As used here, a designated layer can be selected based on user preference and an earlier layer is treated as an automated step down to reduced obfuscation. In a specific implementation, the PII image is a new content image; a new style image is selected by a style image selection engine; and the new content image and new style image are then fed to a neural style transfer engine to generate a new masked PII image. The on-the-fly neural style transfer happens only till the designated layer. For example, if a layer 3 image is deemed appropriate, the propagation in the network stops at layer 3. The output from the designated layer which is essentially the masked PII image with appropriate distortions is fetched. If available, a masked PII image stored in a PII metadata datastore from a previous neural style transfer may or may not be fetched, which can make it unnecessary to perform a neural style transfer to a designated or earlier layer.

The flowchart 1100 continues to module 1118 with generating a pop-up window and ends at module 1120 with presenting a customized masked PII image in the pop-up window. For example, a pop-up window can be rendered and presented to the viewer and the customized masked PII image (image from earlier layers with lesser distortions) is rendered on the pop-up window. In a specific implementation, further customization options are made available in the pop-up window. In an alternative, the customized masked PII image can be presented in some other manner than in a pop-up window, such as in a UI display element, in a new message, or in some other applicable manner.

In an alternative, the flowchart 1100 can loop back to decision point 1108 to enable a viewer to select an even less obfuscated masked PII image if even a reduce-distortion masked PII image was still too hard to read.

Figure 12:
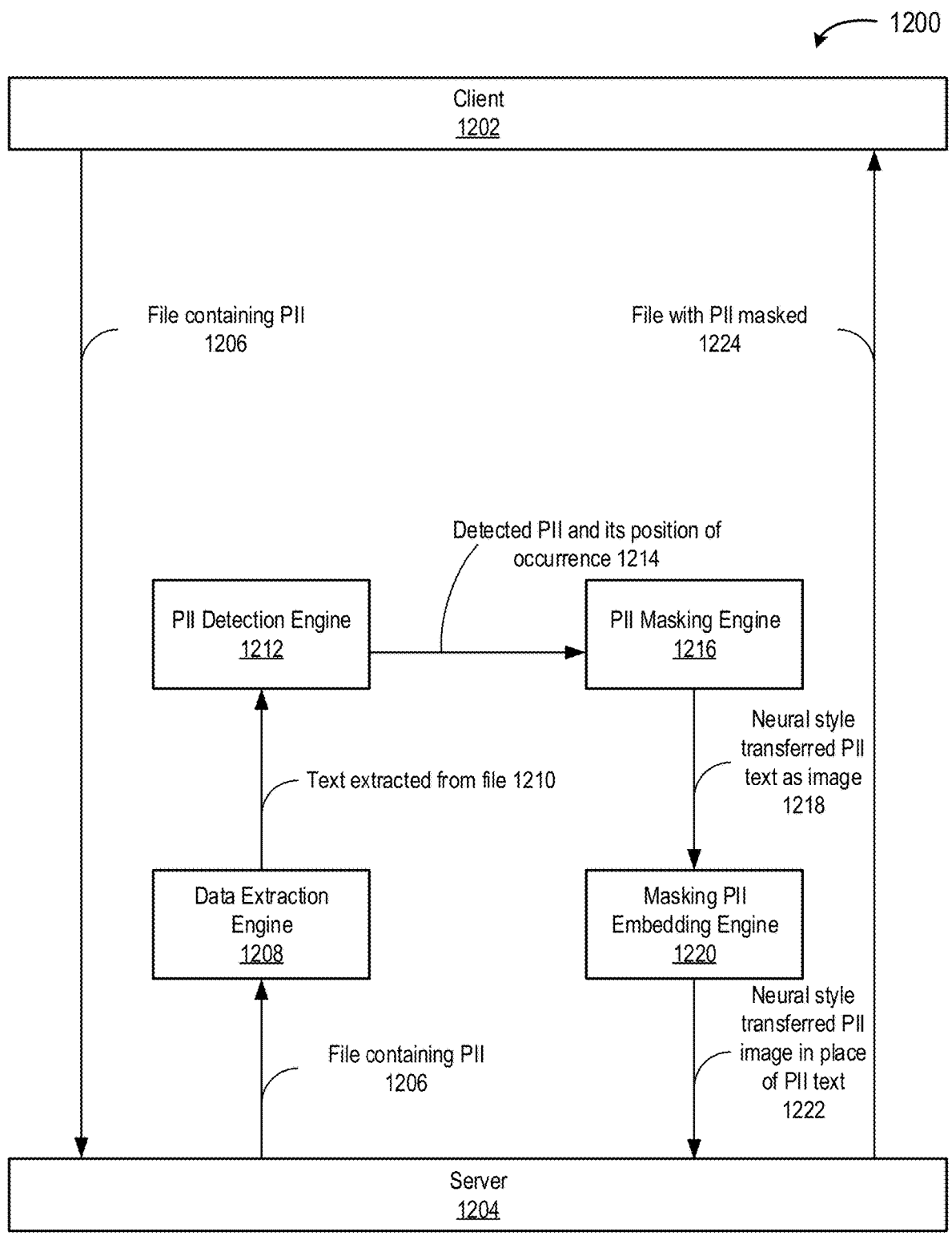
FIG. 12 shows a process flow diagram of an example of a method of PII masking.

FIG. 12 shows a process flow diagram 1200 of an example of a method of PII masking. For illustrative purposes, the flow is from a client 1202 to a server 1204 and back again. In this example, a file containing PII 1206 is sent from the client 1202 to the server 1204. At the server, the file containing PII 1206 is provided to a data extraction engine 1208, which extracts text from input document. Text extracted from the file 1210 is provided to a PII detection engine 1212, which detects PII in the input document. Detected PII and its position of occurrence 1214 is provided to a PII marking engine 1216, which converts PII text to image by, for example, introducing distortions to the PII text. 1. Neural style transfer is applied to the image with PII text (using a neural style transfer engine, not shown) and a neural style transferred PII text as image 1218, which is masked PII, is provided to a masking PII embedding engine 1220, which embeds the masked PII into the input document. The server 1204 then sends the neural style transferred PII in place of PII text from the masking PII embedding engine 1220 to the client 1202.

The process of rendering masked PII to a viewer involves the following steps:

1. Render the document containing masked PII image on a word processor, like Zoho Writer;
2. On viewer action like hovering/selecting the masked PII for the first time, place a pop-up window besides the default masked PII image in the original document;
3. Render the customized masked PII with lesser distortions (Layer 4 image) in the pop-up window;
4. On viewer action like hovering/selecting the masked PII for second instance, e.g., within predetermined time, provide further customization options in the pop-up window to display another customized masked PII image (Layer 3 image) which could be more easily recognized by human eye. This customized masked PII is still unreadable by bot.

In a use case, Zoho Writer® is a word processor that enables collaboration among users. While publishing a document using Zoho Writer, an author can choose to mask PII (if any) in the document before the document content is available to a viewer or class of viewers. The readability customization options and style image personalization options can be integrated and made available in Zoho Writer.

While various aspects and embodiments have been disclosed herein, other aspects and embodiments should be apparent to those skilled in the relevant art. The language used in the specification has been principally selected for readability and instructional purposes, and it may or may not have been selected to delineate or circumscribe inventive subject matter. It is intended that the invention as presented in the claims not be unnecessarily limited by this detailed description.

What is claimed is:

1. A method comprising:
rendering a document with one or more masked personal identifiable information (PII) images, wherein a masked PII image of the one or more masked PII images is generated by a neural style transfer engine at a first level of distortion, wherein the masked PII image is an obfuscation of PII;
determining that a viewer of the rendered document is not a bot;
detecting an indication that the viewer desires a less obfuscated rendering of the PII;
fetching a content image associated with the PII;
fetching a style image using a style image selection engine;
extracting characters from the PII;
generating text glyphs using a font datastore and the extracted characters;
distorting the text glyphs;
converting the distorted text glyphs to an image;
adding random noise to the image to generate the content image;
storing the content image;
providing the content image and the style image as input to the neural style transfer engine; and
performing neural style transfer using the neural style transfer engine, with the input, to generate a customized masked PII image at a second level of distortion, wherein the customized masked PII image has less distortion than the masked PII image.

2. The method of claim 1, wherein a bot traffic detection suite is used to determine whether the viewer is a bot.

3. The method of claim 1, wherein the first level of distortion is derived from Layer 5 of the neural style transfer engine, wherein the customized masked PII image at the second level of distortion is derived from Layer 4 of the neural style transfer engine, and wherein the generation of the customized masked PII image is based on an indication from the viewer.

4. The method of claim 1, wherein the first level of distortion is derived from a layer of the neural style transfer engine that has been determined to be sufficient to make the PII unreadable to a bot.

5. The method of claim 1, comprising determining that the viewer of the rendered document is not an automation script.

6. The method of claim 1, comprising determining that the viewer of the rendered document is not a malicious actor.

7. The method of claim 1, wherein the style image selection engine considers preferences when fetching the style image.

8. The method of claim 1, wherein the first level of distortion is one of several levels of distortion computed during the neural style transfer.

9. The method of claim 1, wherein the customized masked PII image has improved human readability relative to the masked PII image but still interferes with attempts to perform optical character recognition (OCR).

10. The method of claim 1, comprising generating a pop up window and presenting the customized masked PII image in the pop up window.

11. The method of claim 1, comprising:
using metadata associated with the PII to generate the masked PII image at the first level of distortion by the neural style transfer engine;
storing the content image when the masked PII image is generated at the first level of distortion by the neural style transfer engine; and
fetching the metadata associated with the PII for use by the neural style transfer engine to generate the customized masked PII image at the second level of distortion.

12. The method of claim 1, wherein the text glyphs are generated based on domain knowledge of the PII.

13. A system comprising:
a neural style transfer engine configured to generate a masked personal identifiable information (PII) image at a first level of distortion, wherein a document is rendered with the one or more masked PII images including the masked PII image, wherein the masked PII image is an obfuscation of PII;
a bot detection suite used to determine a viewer of the rendered document is not a bot;

a readability customization engine configured to receive an indication that the viewer desires a less obfuscated rendering of the PII;

a style image selection engine configured to fetch a style image;

a character extractor engine configured to extract characters from the PII;

a font datastore;

a glyph generator engine configured to generate text glyphs using the font datastore and the extracted characters;

a glyph distorter engine configured to distort the text glyphs;

a text to image converter engine configured to convert the distorted text glyphs to an image;

a random noise adder engine configured to add random noise to the image to generate a content image;

a PII metadata datastore configured to store the content image; and a neural style transfer engine configured to fetch the content image associated with the PII, wherein the content image and the style image are provided as input to the neural style transfer engine, and to perform neural style transfer, with the input, to generate a customized masked PII image at a second level of distortion, wherein the customized masked PII image has less distortion than the masked PII image.

14. The system of claim 13, wherein the first level of distortion is derived from Layer 5 of the neural style transfer engine, wherein the customized masked PII image at the second level of distortion is derived from Layer 4 of the neural style transfer engine, and wherein the generation of the customized masked PII image is based on an indication from the viewer.

15. The system of claim 13, wherein the first level of distortion is derived from a layer of the neural style transfer engine that has been determined to be sufficient to make the PII unreadable to a bot.

16. The system of claim 13, wherein the bot detection suite is used to determine that the viewer of the rendered document is not an automation script.

17. The system of claim 13, wherein the style image selection engine considers preferences when fetching the style image.

18. The system of claim 13, wherein the first level of distortion is one of several levels of distortion computed during the neural style transfer.

19. The system of claim 13, wherein the customized masked PII image has improved human readability relative to the masked PII image but still interferes with attempts to perform optical character recognition (OCR).

20. The system of claim 13, wherein the neural style transfer engine:
uses metadata associated with the PII to generate the masked PII image at the first level of distortion;
stores the content image when the masked PII image is generated at the first level of distortion; and
generates the customized masked PII image at the second level of distortion using the metadata associated with the PII.

21. The system of claim 13, wherein the text glyphs are generated based on domain knowledge of the PII.

* * * * *